Jan. 24, 1967 D. E. MEIER ETAL 3,300,656
RESONANT ENERGY VOLTAGE REGULATOR PROVIDING CONSTANT
TOTAL ENERGY PULSES DEPENDENT ON, BUT NOT
AFFECTED BY, LOAD REQUIREMENTS
Filed March 30, 1964 4 Sheets-Sheet 1

INVENTORS
DON E. MEIER
BY DONALD J. ROTIER

Dugger Braddock Johnson & Westman
ATTORNEYS

Jan. 24, 1967     D. E. MEIER ETAL     3,300,656
RESONANT ENERGY VOLTAGE REGULATOR PROVIDING CONSTANT
TOTAL ENERGY PULSES DEPENDENT ON, BUT NOT
AFFECTED BY, LOAD REQUIREMENTS
Filed March 30, 1964     4 Sheets-Sheet 2
FIG. 4
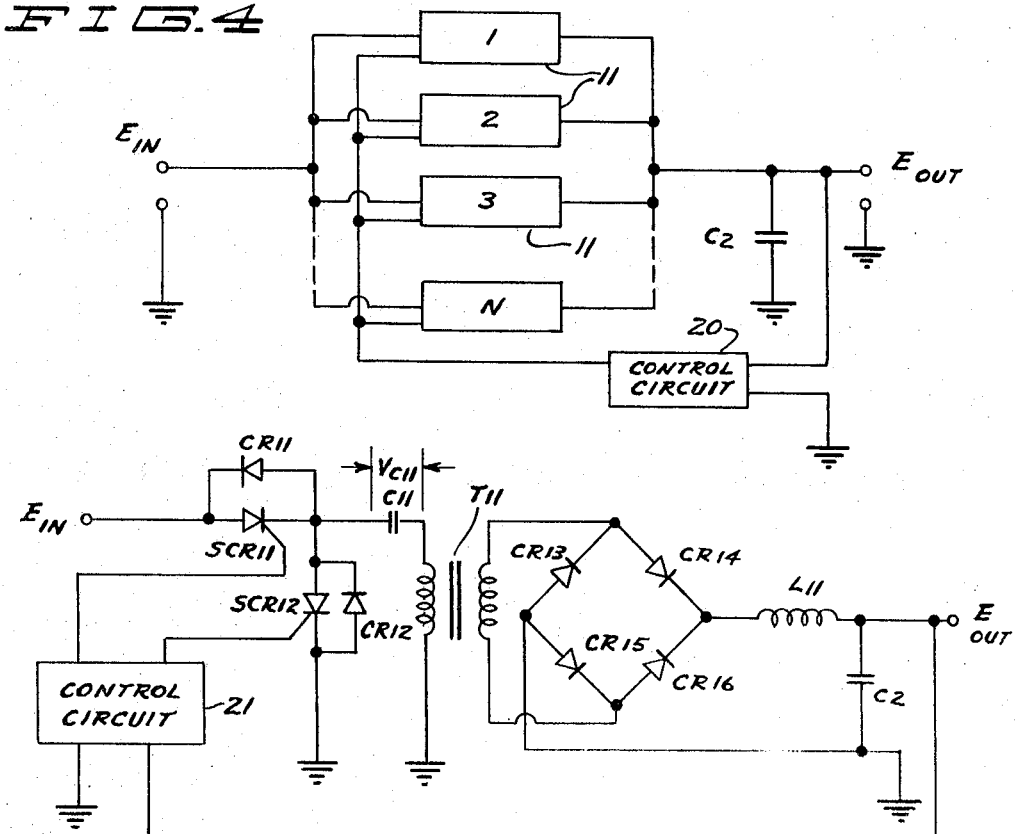
FIG. 5
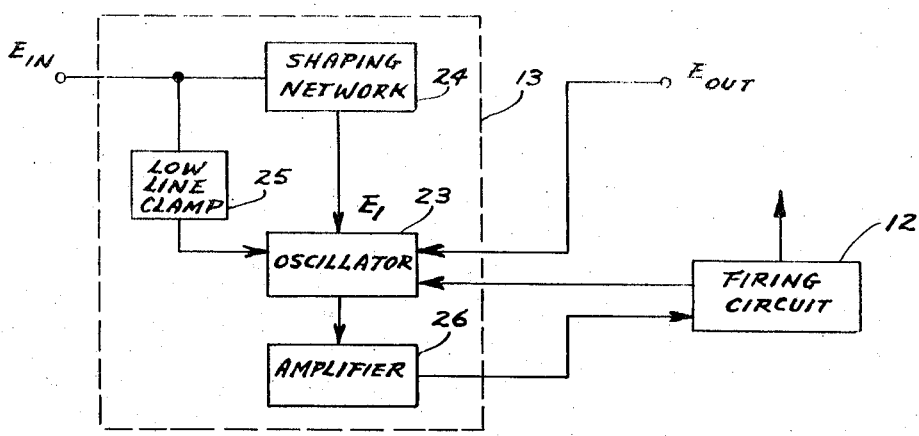
FIG. 6
INVENTORS
DON E. MEIER
BY DONALD J. ROTIER
Dugger Braddock Johnson + Westman
ATTORNEYS Jan. 24, 1967     D. E. MEIER ETAL     3,300,656
RESONANT ENERGY VOLTAGE REGULATOR PROVIDING CONSTANT
TOTAL ENERGY PULSES DEPENDENT ON, BUT NOT
AFFECTED BY, LOAD REQUIREMENTS Filed March 30, 1964     4 Sheets-Sheet 3

INVENTORS
DON E. MEIER
DONALD J. ROTIER
BY Dugger Braddock Johnson & Westman
ATTORNEYS Jan. 24, 1967  D. E. MEIER ETAL  3,300,656
RESONANT ENERGY VOLTAGE REGULATOR PROVIDING CONSTANT
TOTAL ENERGY PULSES DEPENDENT ON, BUT NOT
AFFECTED BY, LOAD REQUIREMENTS
Filed March 30, 1964  4 Sheets-Sheet 4

INVENTORS
DON E. MEIER
BY DONALD J. ROTIER
Dugger Braddock Johnson + Westman
ATTORNEYS

United States Patent Office 3,300,656
Patented Jan. 24, 1967

3,300,656
RESONANT ENERGY VOLTAGE REGULATOR PROVIDING CONSTANT TOTAL ENERGY PULSES DEPENDENT ON, BUT NOT AFFECTED BY, LOAD REQUIREMENTS
Don E. Meier, Minneapolis, and Donald J. Rotier, Crystal, Minn., assignors to Ault Incorporated, a corporation of Minnesota
Filed Mar. 30, 1964, Ser. No. 355,737
13 Claims. (Cl. 307—88.5)

This invention has relation to transistor power conversion circuits; and more particularly to such a circuit providing voltage regulation by delivering current pulses to an output capacitor bank.

A conventional voltage regulator employs an LC filter and oscillates at the natural frequency of this filter whenever the output load is suddenly changed. The present invention presents a circuit not subject to such oscillation.

In the resonant energy transfer circuit of the present invention, current pulses are emitted to an output capacitor bank whenever the output voltage drops to a preselected lowest desired output voltage. The current pulses stop whenever the output voltage rises to a maximum preselected output voltage. As a result there can be no voltage fluctuations beyond the preselected limits even with large and sudden changes in load conditions; and the voltage regulation will be fixed and determined by the difference between these maximum limits.

In the drawings,

FIG. 4 is a block diagram illustrating combination of several resonant energy transfer circuits in parallel;

FIG. 5 is a schematic diagram of a second form of the resonant energy transfer circuit of the invention;

FIG. 6 is a block diagram of the various elements which make up the predictor circuit block of FIG. 1;

Figure 1:
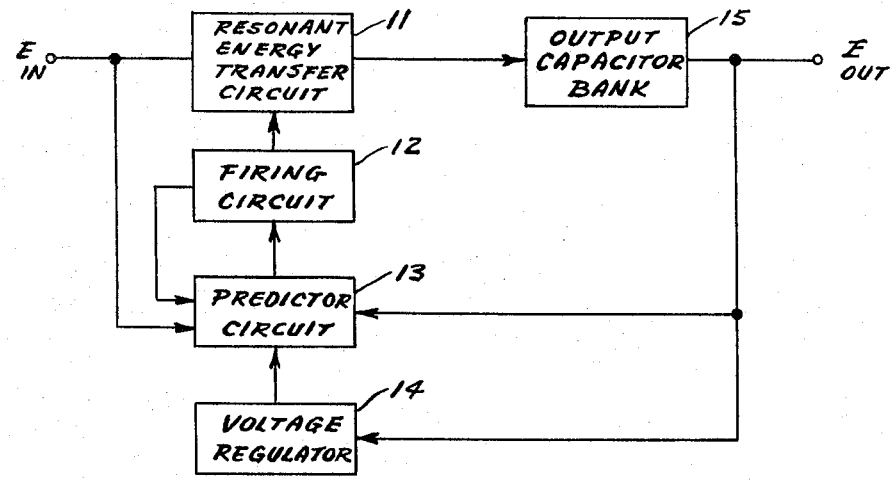
FIG. 1 is a block diagram of a circuit constructed in accordance with the present invention.

Referring to FIG. 1, a resonant energy transfer circuit 11 contains an electronic switch which emits a current pulse whenever it is triggered by a firing circuit 12. The firing circuit in turn emits a triggering current whenever it receives a signal from an oscillator in a predictor circuit 13. The rate of oscillation of the oscillator in the predictor circuit is controlled by a voltage regulator 14 which is in turn connected to the output voltage $E_{out}$. The current pulses emitted by the resonant energy transfer circuit 11 are stored in an output capacitor bank 15 which discharges linearly between pulses thus giving a sawtooth wave output.

Figure 2:
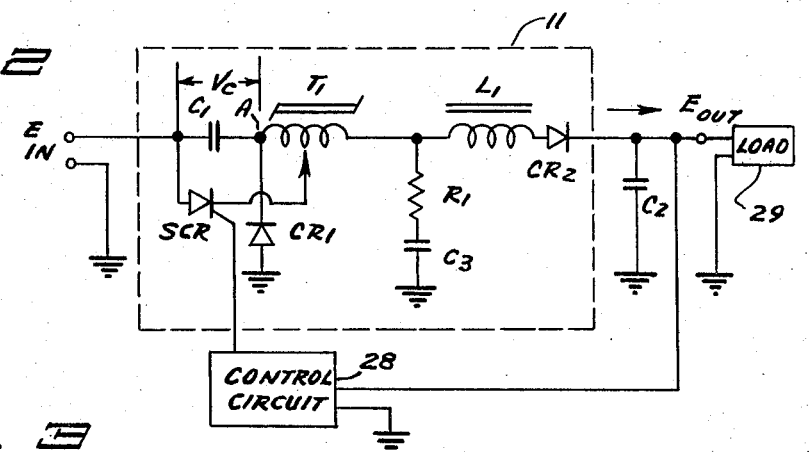
FIG. 2 is a schematic diagram of a first form of the resonant energy transfer block of FIG. 1, for example.

FIG. 2 is a schematic diagram of a first form of the resonant energy transfer circuit of block 11. This circuit uses a silicon controlled rectifier SCR to transfer energy from an unregulated direct current source ($E_{in}$) to an output capacitor bank (C2) through a series resonant LC network. The silicon controlled rectifier is a high current, high voltage, high efficiency semiconductor switch. It will block current flow even with a substantial forward voltage applied until a signal current is applied at the gate, and then it will go into high current conduction and remain in high current conduction until the cathode to anode voltage drops to zero or below. Silicon controlled rectifiers are discussed in General Electric publication ECG–371–1, dated December 1958, a report entitled, "Notes on the Application of the Silicon Controlled Rectifier."

The resonant energy transfer circuit of the present invention can best be understood by examining one cycle of operation of the circuit of FIG. 2.

Before silicon controlled rectifier SCR fires, the voltage $V_c$ across capacitor C1 is equal to the input voltage $E_{in}$, since diode CR1 prevents point A from going negative, and since diode CR2 prevents it from going positive. A transformer T1 is at positive saturation.

A control circuit 28 can consist of the firing circuit 12, predictor circuit 13, and voltage regulator 14 of the block diagram of FIG. 1; and this control circuit will fire the silicon controlled rectifier SCR. A large current then flows through the silicon controlled rectifier SCR to transformer T1 which acts as an auto transformer with part of the current flowing through point A to discharge capacitor C1, and a part flowing through an inductive element L1 and the diode CR2, thus charging the output capacitor bank C2. This causes the transformer T1 to move away from positive saturation along its B–H loop. Capacitor C1 will continue to discharge through one-half of the transformer T1 until it builds up a reverse charge equal to the forward charge it had previously. When capacitor C1 is fully reverse charged, current stops flowing into it, and transformer T1 returns to positive saturation again, acting as a short circuit. The silicon controlled rectifier SCR then becomes back biased and remains back biased while capacitor C1 discharges through inductive element L1 charging the capacitor bank C2 with a second surge of current. The time which it takes capacitor C1 to discharge allows the silicon controlled rectifier SCR to commutate to a non-conducting state.

The discharge of the capacitor C1 continues until the voltage $V_c$ across it again reaches the input voltage. At this time, point A is at zero voltage and diode CR1 prevents it from going negative. The voltage across capacitor C1 remains at the input voltage level until the silicon controlled rectifier SCR fires again.

After capacitor C1 is fully discharged, the current in inductive element L1 decays linearly, passing through diode CR1, which acts as a free-wheeling diode. When this current reaches zero, diode CR2 prevents further decay and no current flows until the rectifier SCR fires again. When the rectifier SCR fires the next time, it will see the same initial conditions as when it fired the preceding time. The result is uniformity of current pulses at given input and output voltages. Thus the amount of energy transferred per pulse can accurately be predicted, and by controlling the firing rate of the silicon controlled rectifier SCR, a regulator voltage output is obtained.

Figure 3:
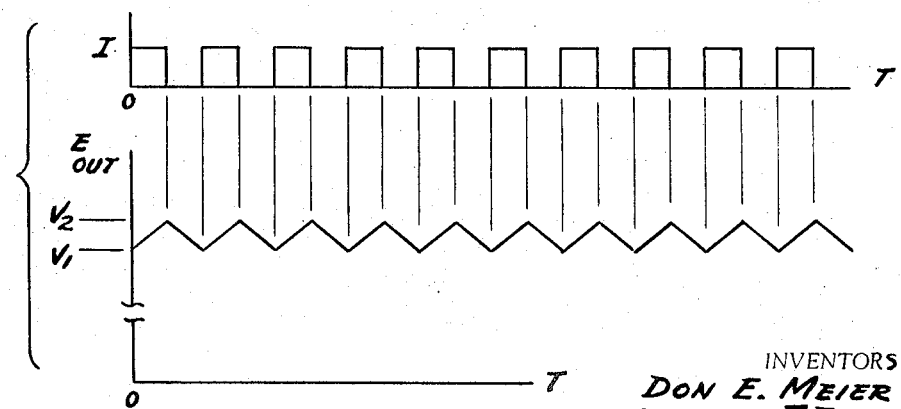
FIG. 3 illustrates the relationship between current pulses and the output voltage of a circuit embodying the invention.

FIG. 3 shows the relationship between current pulses and output voltage of the resonant energy transfer circuit of FIG. 2, for example. In FIG. 3, the current I and the output voltage $E_{out}$ are plotted against the same time scale T. A preselected desired minimum output voltage V1 and a preselected desired maximum output voltage V2 are indicated along the output voltage scale. When the output voltage drops to the minimum value V1, the control circuit 28 causes the silicon controlled rectifier SCR to fire in a manner which will be described, and a current pulse passes through the inductive element L1 to charge the capacitor bank C2 to the maximum voltage indicated at V2 in FIG. 3. The current then ceases to flow through the inductive element L1, and the capacitor bank C2 will discharge through a load 19 until the output voltage again reaches the point indicated at V1 at which time the control circuit will cause the resonant energy transfer circuit to fire again. The energy transferred on each current pulse and the pulse shape are determined by the circuit elements. Resistor R1 and capacitor C3 are included to suppress any high voltage peaks which might occur.

Ripple in the output is determined by the pulse size and the period between pulses. For high power outputs, this ripple can be very sizable. This ripple can be reduced by a factor of 1/N if N resonant energy transfer circuits 11 are placed in parallel as shown in FIG. 4. A control circuit 20 will then fire the resonant energy transfer circuits 11 in succession providing N times as many pulses per unit of time as with the single circuit illustrated in FIG. 2.

The second form of the resonant energy transfer circuit as illustrated in FIG. 5 employs two silicon controlled rectifier switches, SCR11 and SCR12 respectively to improve the output characteristics somewhat over the disclosure of the circuit of FIG. 2 and to provide isolation of the output from the input. This circuit of FIG. 5 can also best be understood by examining one cycle of operation.

Initially both silicon controlled rectifier switches SCR11 and SCR12 are nonconductive, and no currents are flowing in the circuit. When switch SCR11 is fired by a control circuit 21, the input voltage $E_{in}$ will be imposed across a capacitor C11. This causes a current pulse to flow through the input side of a transformer T11, which in turn induces a current pulse through the output side thereof. This current pulse will be sinusoidal with a resonant frequency determined by the values of capacitor C11 and inductive element L11. This is the equivalent to a series LC circuit. When capacitor C11 is fully charged, current stops flowing in the transformer T11. However, the current continues to flow through the inductive element L11 and either through diodes CR13 and CR14 or through diodes CR15 and CR16. This free-wheeling discharge decays linearly to zero. At the same time, the current on the input side of the circuit drops to zero, and due to leakage inductance on the transformer T11, capacitor C11 becomes slightly overcharged. This provides a reverse bias on rectifier SCR11 long enough to commutate it. Meanwhile, the excess charge quickly discharges through diode CR11. When the currents on both sides of the circuit reach zero, capacitor C11 is left charged to the input voltage $E_{in}$.

The next current pulse is provided when the control circuit 21 fires rectifier switch SCR12. This causes capacitor C11 to discharge at the same resonant frequency as it charged when rectifier SCR11 was fired. Again, a current pulse is induced on the output side of transformer T11, but in a direction opposite from that when rectifier SCR11 was fired. When capacitor C11 is completely discharged, the bridge rectifiers on the output side act as free-wheeling diodes again and the output wave form is identical to the one produced when rectifier SCR11 fired. The leakage inductance on the transformer will build up a small reverse voltage on capacitor C11. This in turn reverse biases rectifier SCR12 long enough to commutate it. At the same time, capacitor C11 will quickly discharge through a diode CR12. When all the currents have stopped flowing, C11 is fully discharged and the conditions are identical to those before rectifier SCR11 was fired. This embodiment of the invention isolates the power supply from the load. This feature is particularly desirable in many modern power supply applications.

As previously set out, the control circuits such as indicated at 28, 20 and 21, are operative to fire the rectifier switches responsive to the output voltage across the output capacitor bank C2 reaching a minimum preselected desired value V1. Particular circuitry for accomplishing this purpose will now be disclosed. Such a typical control circuit can consist of the three parts as illustrated in FIG. 1: a firing circuit 12, a predictor circuit 13, and a voltage regulator 14. The firing circuit provides the current pulses needed to fire the silicon controlled rectifier in the resonant energy transfer block 11. It is excited by an oscillator 23 as shown in the block diagram of FIG. 6 which represents the predictor circuit block 13 of FIG. 1. The rate of oscillation of this oscillator 23 is controlled by the predictor circuit 13 and by the voltage regulator 14.

In addition to oscillator 23, the predictor circuit includes a shaping network 24, allow line clamp 25, and an amplifier 26, all as set out in the block diagram of FIG. 6. This circuit causes the oscillator 23 to operate at a frequency which limits the average resonant energy transfer output current as illustrated by the curve shown in FIG. 8 and as will be later more fully explained.

Figure 7:
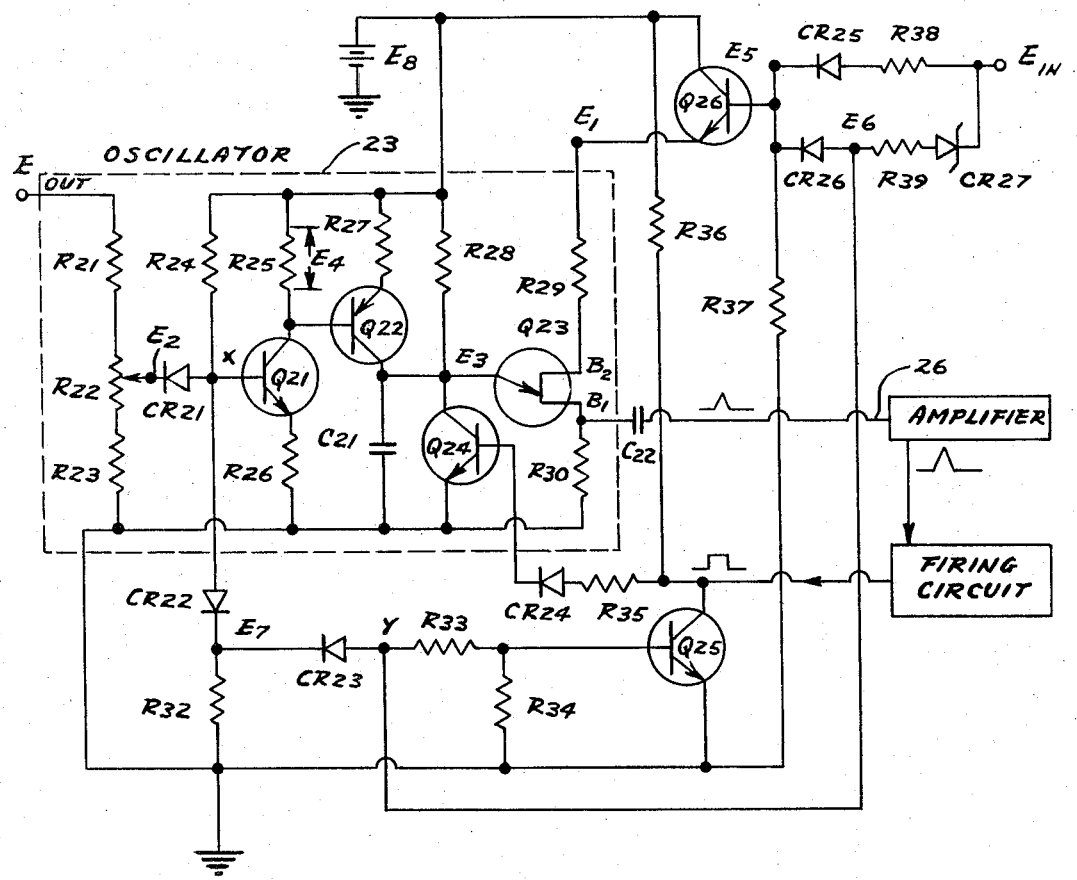
FIG. 7 is a schematic diagram of the circuit of the block diagram of FIG. 6.

In the circuit diagram of FIG. 7, which illustrates the block diagram of FIG. 6, the oscillator block 23 is indicated as being enclosed in dotted lines. $E_{out}$ as illustrated in FIG. 7 is the output voltage of the capacitor bank C2, as seen in FIG. 2, for example, and as indicated at block 15 in FIG. 1. The voltage indicated at E2 is proportional to the output voltage $E_{out}$. The voltage indicated at E1 is the voltage supplied by the shaping network block 24 of FIG. 6. The voltage indicated at E8 is larger than the voltage at E2 so diode CR21 is forward biased. Transistor Q21 acts as an emiter-follower and causes the voltage E2 to appear across resistor R26. This causes a current proportional to the voltage E2 to flow through transistor Q21 from resistor R25, raising a voltage E4 across resistor 25 proportional to voltage E2. This voltage E4 is also applied across resistor 27 and the emitter to base of transistor 22. Thus, a current proportional to voltage E2 flows through transistor 22 and into capacitor C21. This generates a linear ramp voltage across capacitor C21. The slope of the ramp is proportional to the voltage E2 and voltage $E_{out}$.

A unijunction transistor Q23 is used as a switching device. Normally, no current flows from the emitter to base B1 of transistor Q23. However, if the emitter to base B1 voltage reaches a certain fraction of the base B2 to base B1 voltage, breakdown of the emitter to base B1 junction occurs, and this path becomes a low resistance path. Transistor Q23 continues to conduct until the emitter to base B1 voltage again drops below the base B2 to base B1 voltage, after which it resumes its blocking state.

Since the voltage across capacitor C21 and consequently the voltage indicated at E3 is a ramp voltage, it increases until it reaches the breakdown voltage of transistor Q23. A pulse is then transmitted via capacitor C22 to amplifier 26 and, after being amplified, to firing circuit 12. This breakdown also causes capacitor C21 to discharge through transistor Q23. Voltage E3 then drops low enough so that transistor Q23 shuts off and resumes its blocking state. At this time, a positive voltage pulse from the firing circuit 12 is applied to the base of a transistor Q24. This causes transistor Q24 to conduct for a short time, completing the discharge of capacitor C21. The circuit is then in its initial state and prepared to generate a new pulse. In this way, a series of pulses is generated by the oscillator 23 and transmitted through the amplifier to the firing circuit 12.

Figure 8:
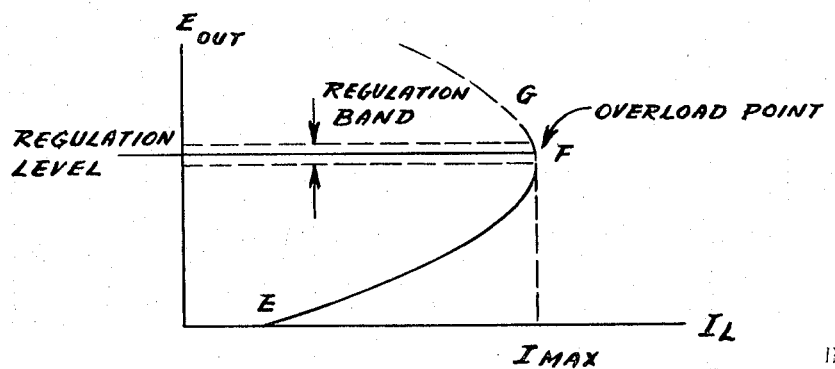
FIG. 8 is a graph relating the output voltage of a circuit of the invention to the average current drawn therefrom.

In FIG. 8, the output voltage $E_{out}$ is plotted against the average current $I_L$ drawn from the resonant energy transfer circuit. The frequency of oscillator 23 is directly proportional to the output voltage $E_{out}$ since as $E_{out}$ increases, capacitor C21 charges more rapidly and the breakdown voltage in transistor Q23 is reached more rapidly. Since this oscillator frequency is proportional to the output voltage $E_{out}$, the average current output decreases when the output voltage $E_{out}$ is small and decreases, thus giving the "bend back" of the curve of FIG. 8 from the point F to the point E. Above the overload point indicated on FIG. 8 of the resonant energy transfer circuit, an increase in output voltage $E_{out}$ will cause a reduction in the average current output as shown from the point F to the point G.

The oscillator frequency is inversely proportional to voltage E1. Since voltage E1 is the base B2 to base B1 voltage of transistor Q23, it controls the breakdown voltage of transistor Q23. As the breakdown voltage of this transistor Q23 increases, the time to charge the circuit through the breakdown circuit is increased, and therefore the oscillator frequency is decreased.

Figure 9:
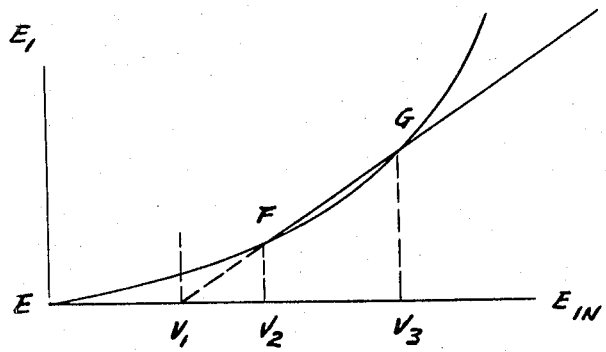
FIG. 9 is a graph relating a shaping network output voltage to the input voltage.

Point F in FIG. 8 represents the overload point of the resonant energy transfer circuit, as indicated. As the input voltage varies, the curve EF and particularly the point B will also vary. The purpose of the shaping circuit 24 is to hold the curve in FIG. 8 constant and thereby to prevent the output current from varying with the output voltage. In FIG. 9, the curve illustrates the value of the voltage E1 needed to maintain the point F of FIG. 8 constant as a function of the input voltage $E_{in}$. This curve is approximated by straight lines EF and FG.

The shaping network circuitry necessary to promptly reshape voltage E1 is shown in the upper right hand portion of FIG. 7. When the input voltage $E_{in}$ is less than the preselected desired minimum output voltage V1 of FIGS. 3 and 9, a zener diode CR27 is non-conducting. The voltage indicated at E5 then rises at a slope determined by the resistor 37 and resistor 38. This is lines EF in FIG. 9. When the input voltage reaches a value V1, zener diode CR27 starts to conduct, and the voltage indicated at E6 starts to rise at a faster rate than the voltage indicated at E5. When the input voltage reaches the preselected desired maximum output voltage V2 as indicated in FIGS. 3 and 9, the voltage as indicated at E6 reaches the voltage as indicated at E5, and diode CR26 becomes forward biased. Then, as the input voltage is increased above the value V2, the voltage as indicated at E1, G5 and E6, rise together on the slope FG as seen in FIG. 9.

If the firing rate of the silicon controlled rectifiers reaches too high a rate, the current pulses will overlap and the silicon controlled rectifiers will fail to commutate. This problem will occur particularly when the entire circuit is switched on or switched off. Therefore, a low line clamp circuit 25 is included to limit the upper frequency of the oscillator. This low line clamp 25 is also detailed in FIG. 7. When the input voltage $E_{in}$ is less than voltage V1 in FIGS. 3 and 9, zener diode CR27 is non-conducting. Therefore, the voltage indicated at E8 is applied to the base of transistor Q24, turning it on. This holds the voltage indicator at E3 below the breakdown voltage of transistor Q23 and prevents the oscillator 23 from operating.

When the circuit is first turned on, the oscillator frequency would ordinarily rise too high. The low line clamp circuit 25 prevents this. As input voltage $E_{in}$ is increased above a point V1, zener diode CR27 starts to conduct, and the voltage at E6 begins to rise. The voltage at E7 is nearly equal to the voltage at E6 and causes the cathode of diode CR22 to become positive. Since the output voltage and therefore the voltage at E2 is near zero volts, diode CR21 is forward biased and diode CR22 is reverse biased. As a result, the current applied to capacitor C21 is controlled by the voltage E2, thus giving a low oscillator frequency. When the current is turned off, ordinarily the voltage indicated at E1 would drop to zero and again the oscillator frequency would rise too high, except for the clamping circuit 25. With the clamping circuit, as the input voltage $E_{in}$ decreases, the voltage indicator at E7 becomes less than that indicated at E2. Diode CR21 becomes reverse biased and diode CR22 becomes forward biased. Therefore, the voltage indicated at E7 becomes the controlling input for transistor Q21 and determines the amount of current supplied to capacitor C21. This slows down the charging of capacitor C21 and the use of the oscillator frequency.

Figure 10:
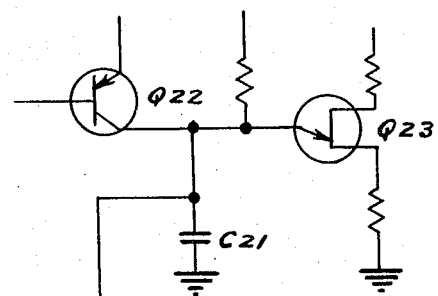
FIG. 10 is a schematic diagram of a voltage regulator of the block diagram of FIG. 1.
Figure 10:
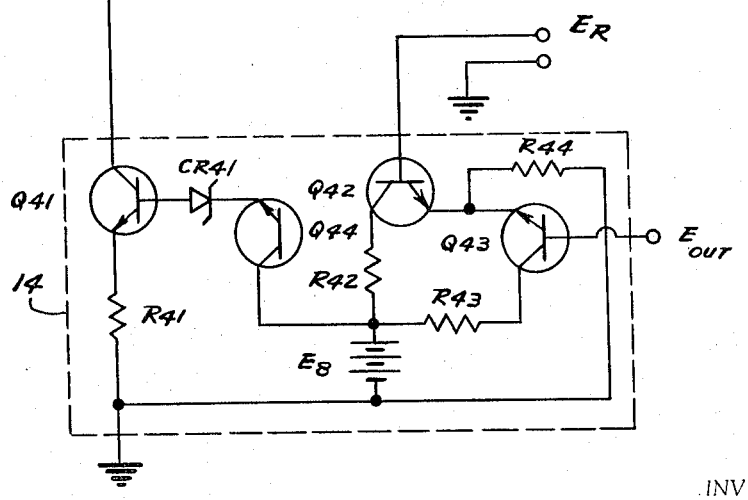

A circuit for the voltage regulator 14 is shown in FIG. 10. The capacitor 21, transistor 22, and unijunction transistor 23 shown in the upper part of FIG. 10 are elements of the oscillator circuit 23 as shown in FIG. 7. A suitable very stable reference voltage indicated ER and the output voltage $E_{out}$ are compared in a conventional transistor differential amplifier circuit. When the output voltage $E_{out}$ exceeds the reference voltage, current flows through transistor Q43 and imposes a reverse bias on transistor Q42. This shuts transistor Q42 off. Current then flows from the collector of transistor Q42, lowering the base voltage on the transistor Q44. A zener diode CR41 then begins to conduct and current flows through transistor Q41. This in turn reduces the flow of current into capacitor C21, lowering the slope of the voltage ramp. This causes the oscillator frequency to decrease. When the output voltage $E_{out}$ drops below the reference voltage $E_R$, transistor Q42 conducts, shutting off transistor Q43. The base voltage on transistor Q44 then rises shutting off the zener diode CR41. Transistor Q41 then stops conducting, and the flow of current into capacitor C21 increases. This increases the oscillator frequency.

Pulses from oscillator 23 are fed through amplifier 26, which may be any good pulse amplifier. These amplified pulses are then fed to the firing circuit 12 as most clearly seen in FIG. 6. The firing circuit may be any pulse generator which will generate pulses capable of firing a silicon controlled rectifier or other electronic switch when applied to the gate of that switch. These pulses then fire the resonant energy transfer circuit at a frequency determined by the control circuit, and a signal which is a function of the pulse generated by the firing circuit is fed back into the oscillator as seen in FIGS. 6 and 7.

The entire system provides a very well regulator power supply.

What is claimed is:

1. A circuit for providing across a load a sawtooth regulated unidirectional voltage varying between a first minimum and a second maximum voltage value, said circuit including a source of unidirectional voltage, an inductive element in series with said load, a capacitor across said load, resonant circuit means when energized first providing and then interrupting a current path from said source through said inductive element and across said capacitor, and control means for repeatedly energizing said circuit means at a rate varying as a function of the voltage across said capacitor, and between said first minimum and second maximum voltage values.

2. The combination as specified in claim 1 wherein said resonant circuit means includes said inductive element, a saturable transformer, a second capacitive element in series with said transformer, a semi-conductor switch having a first current block state and a second current conducting state connected in parallel with said second capacitive element and a first portion of said saturable transformer, a second portion of said transformer being connected in series with said switch and with said first mentioned inductive element, and wherein said control means is connected to said switch to initiate operation of said circuit means by switching said semi-conductor switch from said first state to said second state.

3. The combination as specified in claim 1 and at least one additional similar resonant circuit means in parallel with said already described resonant circuit means, said control means energizing each of said resonant circuit means separately and successively.

4. The combination as specified in claim 2 and at least one similar additional resonant circuit means in parallel with said already described resonant circuit means, said control means energizing each of said resonant circuit means separately and successively.

5. The combination as specified in claim 1 wherein said resonant circuit means includes said inductive element, a saturable transformer, a second capacitive element in series with a primary winding of said transformer, first and second semi-conductor switches each having a first current blocking state and a second current conducting state, said first switch being in series with said source, said second capacitive element and said primary winding, said second switch being connected across said second capacitive element and said primary winding, a separate unidirectional electronic valve connected across each switch to conduct in direction toward said source, and an electronic valve structure between a secondary of said transformer and said inductive element to permit only unidirectional flow through said inductive element, said control means being connected to successively energize said first and second switches from said first state to said second state.

6. In a voltage regulator including a source of input energy and energy storage means for providing regulated output voltage to a load, the improved apparatus for charging the energy storage means to regulate the output voltage comprising:
  triggerable pulse forming means for generating substantially constant total energy pulses regardless of load requirements;
  means connecting said pulse forming means intermediate the source of input energy and the energy storage means;
  trigger means for triggering said pulse forming means, said trigger means being responsive to the output voltage from the energy storage means;
  means connecting said trigger means intermediate the energy storage means and said pulse forming means, for varying the repetition rate of said constant total energy pulses dependent on the output voltage.

7. The apparatus of claim 6 in which said pulse forming means includes means for generating the constant energy pulse with a constant pulse width.

8. The apparatus of claim 6 including:
  a plurality of further pulse forming means, each connected in parallel with said pulse forming means; and
  means connecting said trigger means to each of said pulse forming means for sequential firing thereof dependent on the output voltage.

9. The apparatus of claim 6 in which said pulse forming means includes:
  a capacitor;
  means connecting said capacitor across the source of input energy;
  means including a center-tapped saturable transformer serially connected between one end of said capacitor and the energy storage means;
  controlled rectifier means including input, output and control electrodes;
  means connecting said input and output electrodes between the other end of said capacitor and the center-tap of said transformer; and
  means connecting said control electrode to said trigger means.

10. The apparatus of claim 6 in which said pulse forming means includes:
  a capacitor;
  a transformer including primary and secondary windings;
  a first controlled rectifier connecting one end of said capacitor to a first polarity of the source of input energy;
  a second controlled rectifier connecting said one end of said capacitor to a second polarity of the source of input energy;
  said primary winding connecting the other end of said capacitor to said second polarity of the source of input energy;
  means including rectification means connecting said secondary winding to the energy storage means; and
  said trigger means connected intermediate the energy storage means and a control electrode on each of said first and second controlled rectifiers, for the alternate firing thereof to charge and discharge said capacitor, at a repetition rate dependent on the output voltage.

11. In a voltage regulator including a source of input energy and a capacitor bank for providing regulated output voltage to a load, the improved voltage regulating apparatus comprising:
  first means for always providing substantially uniform pulses upon receipt of a firing signal, said first means providing one of said uniform pulses for each of said firing signals;
  said first means including input terminals, output terminals, and a firing terminal;
  means connecting said input terminals across the source of input energy;
  means connecting said output terminals across the capacitor bank;
  second means responsive to the output voltage for providing firing signals to said first means; and
  means connecting said second means intermediate the capacitor bank and said firing terminal, for providing firing signals to said first means at a rate determined by the output voltage.

12. The apparatus of claim 11 in which said first means comprises:
  a capacitor;
  a center-tapped auto-transformer having a hysteresis loop with saturated limits;
  an inductor;
  a diode;
  means serially and sequentially connecting said capacitor, said transformer, said inductor and said diode between one of said input terminals and one of said output terminals;
  a second diode connected from the other of said input terminals to a junction between said capacitor and said transformer;
  a second capacitor;
  means connecting said second capacitor from said other input terminal to a junction between said transformer and said inductor; and
  a controlled rectifier connected between said one input terminal and the center-tap on said transformer, said controlled rectifier having a gate electrode connected to said firing terminal.

13. The apparatus of claim 11 in which said first means comprises:
  first and second controlled rectifiers each having a gate electrode;
  a capacitor;
  a transformer having primary and secondary winding;
  a diode bridge having bridge input terminals and bridge output terminals;
  an inductor;
  means serially and sequentially connecting said first controlled rectifier, said capacitor, and said primary winding between one of said input terminals and the other of said input terminals;
  said second controlled rectifier connected from said other input terminal to a junction between said first controlled rectifier and said capacitor;
  said secondary winding connected across said bridge input terminals;
  said inductor connected between one of said bridge output terminals and one of said output terminals; and
  the other of said bridge output terminals connected to the other of said output terminals.

(References on following page)

References Cited by the Examiner

UNITED STATES PATENTS

| | | | |
|---|---|---|---|
| 2,693,532 | 11/1954 | Krienen | 315—243 X |
| 2,722,629 | 11/1955 | Germeshausen | 315—243 X |
| 2,722,632 | 11/1955 | Germeshausen | 315—243 X |
| 2,772,352 | 11/1956 | Tellier | 315—243 X |
| 2,835,811 | 5/1958 | Bruyning | 315—243 X |
| 2,969,498 | 1/1961 | Stenudd | 323—22 |
| 3,040,183 | 6/1962 | Farnsworth | 323—22 X |
| 3,120,620 | 2/1964 | Nowell | 307—88.5 |
| 3,196,335 | 7/1965 | Williams | 315—241 X |
| 3,241,041 | 3/1966 | Campanella | 307—88.5 |

ARTHUR GAUSS, *Primary Examiner.*

J. S. HEYMAN, *Assistant Examiner.*